(12) United States Patent　　(10) Patent No.: US 7,446,618 B2
Koyama　　(45) Date of Patent: Nov. 4, 2008

(54) ATOMIC FREQUENCY ACQUIRING APPARATUS AND ATOMIC CLOCK

(75) Inventor: Tomoko Koyama, Hara-mura (JP)

(73) Assignee: Seiko Epson Corporation (JP)

( * ) Notice: Subject to any disclaimer, the term of this patent is extended or adjusted under 35 U.S.C. 154(b) by 132 days.

(21) Appl. No.: 11/613,290

(22) Filed: Dec. 20, 2006

(65) Prior Publication Data

US 2007/0139128 A1　　Jun. 21, 2007

(30) Foreign Application Priority Data

Dec. 21, 2005　(JP) .............................. 2005-367786

(51) Int. Cl.
*H03B 17/00* (2006.01)
(52) U.S. Cl. .................................................. 331/94.1
(58) Field of Classification Search ...................... 331/3, 331/94.1
See application file for complete search history.

(56) References Cited

U.S. PATENT DOCUMENTS

| 6,570,459 | B1 | 5/2003 | Nathanson et al. |
| 6,900,702 | B2 | 5/2005 | Youngner et al. |
| 7,064,835 | B2 * | 6/2006 | Riley et al. ................. 356/437 |

* cited by examiner

*Primary Examiner*—David Mis
(74) *Attorney, Agent, or Firm*—Harness, Dickey & Pierce, P.L.C.

(57) ABSTRACT

An atomic frequency acquisition apparatus includes: a cell enclosing atomic gas therein; a laser light source that oscillates laser light that enters the cell and excites the atomic gas; and a photodetecting section that detects the laser light that has passed the cell, wherein the laser light source and the photodetecting section are attached to a common surface facing an interior of the cell, and the cell has a first reflection section on which the laser light oscillated from the laser light source is incident at an incident angle of 45 degrees, and a second reflection section on which the laser light reflected by the first reflection section is incident at an incident angle of 45 degrees.

9 Claims, 6 Drawing Sheets

ATOMIC FREQUENCY ACQUIRING APPARATUS AND ATOMIC CLOCK

The entire disclosure of Japanese Patent Application No. 2005-367786, filed Dec. 21, 2005 is expressly incorporated by reference herein.

BACKGROUND

1. Technical Field

The present invention relates to atomic frequency acquiring apparatuses and atomic clocks.

2. Related Art

Atomic clocks that control the frequency of an oscillator based on the natural frequency of atoms are more often used in various situations instead of conventional quartz oscillators. Above all, coherent population trapping (CPT) type atomic clocks are suitable for miniaturization and power-saving, and are expected to be applied to cellular phones or other devices in future. The accuracy of an atomic clock may be deteriorated unless its gas cell that encloses atomic gas, laser emission section and photodetector section are accurately aligned with one another on a substrate. The complexity in alignment works is one of the causes that lower the mass production efficiency in manufacturing electronic apparatuses that incorporate atomic clocks. In this connection, U.S. Pat. No. 6,900,702 and U.S. Pat. No. 6,570,459 are examples of related art.

SUMMARY

In accordance with an advantage of some aspects of the present invention, atomic clocks can be made smaller in size, and their mass production efficiency can be improved.

An atomic frequency acquisition apparatus in accordance with an embodiment of the invention is equipped with: a cell enclosing atomic gas therein, a laser light source that oscillates a laser light that enters the cell and excites the atomic gas, and a photodetecting section that detects the laser light that has passed the cell, wherein the laser light source and the photodetecting section are attached to a common surface facing an interior of the cell, and the cell includes a first reflection section on which the laser light oscillated from the laser light source is incident at an incident angle of 45 degrees, and a second reflection section on which the laser light reflected by the first reflection section is incident at an incident angle of 45 degrees.

The first reflection section and the second reflection section may preferably be formed facing the interior of the cell.

The atomic frequency acquisition apparatus in accordance with an aspect of the embodiment of the invention has an opening section in a portion of the cell and a sealing section that is disposed to seal the opening section, wherein the first reflection section and the second reflection section are formed on a surface of the sealing section outside of the cell.

An atomic frequency acquisition apparatus in accordance with another embodiment of the invention is equipped with: a cell enclosing atomic gas therein, a laser light source that oscillates a laser light that enters the cell and excites the atomic gas, and a photodetecting section that detects the laser light that has passed the cell, wherein the laser light source is attached to a first surface facing an interior of the cell, and the photodetection section is attached to a second surface opposing to the first surface.

According to the embodiments of the invention, the cell, the laser light source and the photodetection section are integrated into one piece, such that the apparatus can be made smaller in size. Also, the components do not need to be independently installed on the substrate such that position alignment of the components is not required, which can improve the mass production efficiency of the apparatus.

Also, because the laser light source is disposed inside the cell, a loss that may be caused by reflection of laser light at an incident surface of the cell can be prevented. Similarly, because the photodetection section is disposed inside the cell, a loss that may be caused by reflection of laser light at an emission surface of the cell can be prevented. As a result, the utilization efficiency of laser light can be improved.

It is noted that a portion of the cell may be formed with a ceramic package.

Furthermore, the atomic frequency acquisition apparatus in accordance with an aspect of the invention may be equipped with a protection film that covers the laser light source and the photodetection section.

As a result, the laser light source and the photodetection section can be prevented from deterioration by the gas inside the cell.

The protection film may be formed with, for example, SiN, $SiO_2$, tantalum oxide, vinyl-polyolefin plastics, fluororesin plastics, epoxy acrylate resin, or epoxy resin.

The laser light source and the photodetection section may be chips formed by an epitaxial lift-off method.

The atomic frequency acquisition apparatus in accordance with an aspect of the invention may be used to acquire a time standard frequency in an atomic clock.

DESCRIPTION OF EXEMPLARY EMBODIMENTS

Preferred embodiments of the invention are described below with reference to the accompanying drawings.

Embodiment 1

Figure 1:
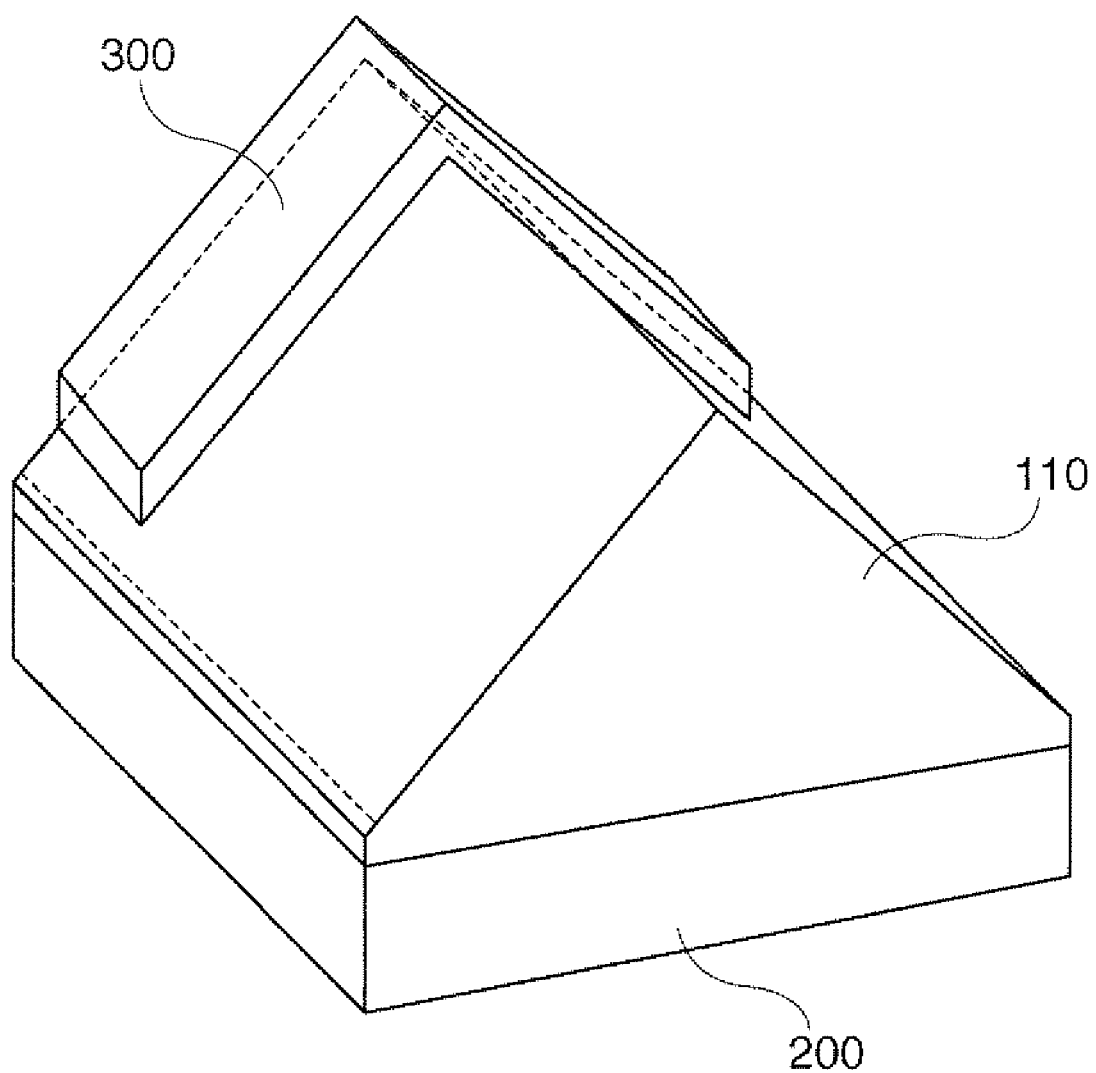
FIG. 1 is a perspective view of the structure of an atomic frequency acquisition apparatus in accordance with an embodiment 1 of the invention.
Figure 2A:
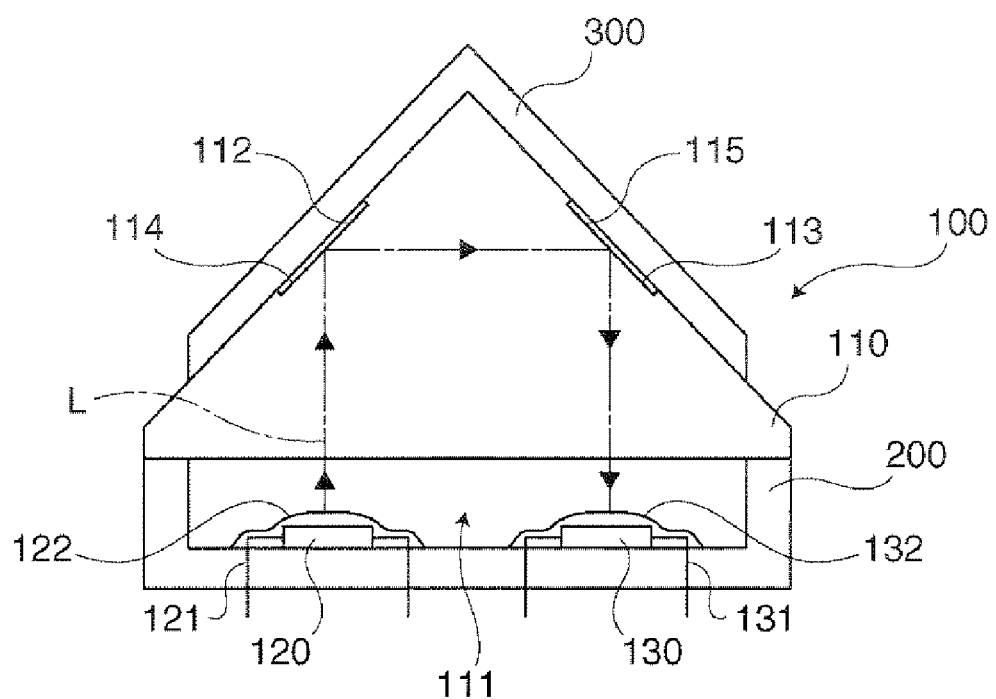
FIG. 2A is a cross-sectional view of the atomic frequency acquisition apparatus.
Figure 2B:
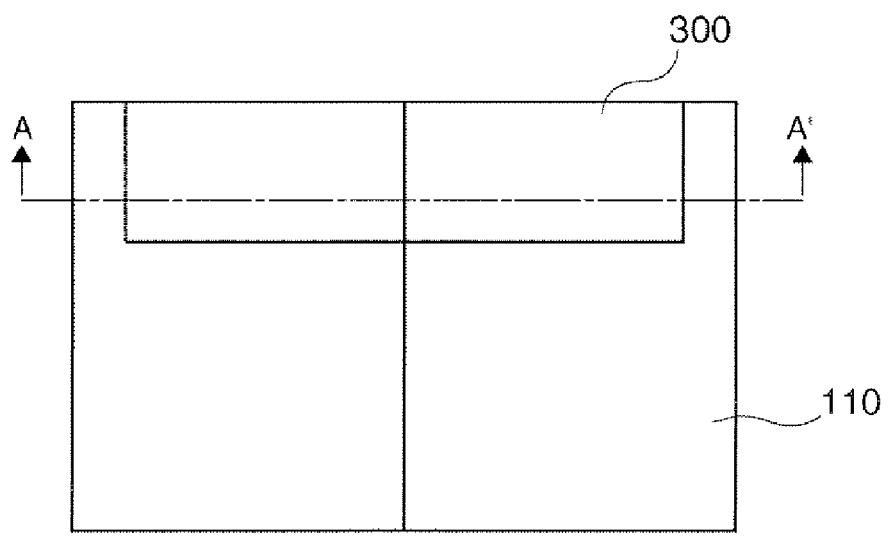
FIG. 2B is a plan view of the atomic frequency acquisition apparatus.

FIG. 1 is a perspective view of the structure of an atomic frequency acquisition apparatus 100 in accordance with an embodiment 1 of the invention. FIG. 2A is a cross-sectional view taken along a line A-A' in FIG. 2B, and FIG. 2B is a plan view of the atomic frequency acquisition apparatus 100. The atomic frequency acquisition apparatus 100 may be used to acquire a time standard frequency in a CPT type atomic clock.

As shown in FIG. 1 and FIGS. 2A and 2B, the atomic frequency acquisition apparatus 100 is equipped with a ceramic package 200 having an opening section in a portion thereof, a sealing section 110 disposed in a manner to seal the opening section, a laser diode (i.e., a laser light source) 120 and a photodetector (photodetection section) 130. The ceramic package 200 and the sealing section 110 form a cell having a cavity (void space) 111 therein. Cesium atom gas is enclosed in the cavity 111.

The ceramic package 200 is formed with ceramics, and the sealing section 110 is formed with glass. As the material of the sealing section 110, in addition to glass, any material that transmits laser light oscillated by the laser diode 120 (for example, laser light with a wavelength of 852 nm oscillated by a VCSEL) can be used.

The laser diode 120 and the photodetector 130 are disposed on a common surface facing the cavity of the ceramic package 200. Also, the laser diode 120 may be connected through a wiring 121, and the photodetector 130 may be connected through a wiring 131, to a driving circuit on an external substrate (not shown).

The laser diode 120 and the photodetector 130 may be in the form of chips formed by an epitaxial lift-off method (hereafter referred to as an ELO method). In accordance with an ELO method applied to form elements (the laser diode 120, the photodetector 130), a sacrificial layer is formed with aluminum, gallium, arsenic, and the like between the substrate and the elements, and the sacrificial layer is etched, thereby separating the element sections from the substrate. In accordance with the embodiment 1, the laser diode 120 and the photodetector 130 are formed by an ELO method, and both of the elements are obtained as ELO chips, such that they can be readily handled when they are attached to the cell 110. It is noted that the laser diode 120 is a vertical cavity surface-emitting laser (VCSEL) in this example.

The laser diode 120 and the wiring 121, and the photodetector 130 and the wiring 131 are covered by protection films 122 and 132, respectively. The protection films 122 and 132 may be formed with, for example, SiN, $SiO_2$, tantalum oxide, vinyl-polyolefin plastics, fluororesin plastics, epoxy acrylate resin, epoxy resin or the like.

The protection films 122 and 132 can prevent the laser diode 120 and the wiring 121 and the photodetector 130 and the wiring 131 from being deteriorated by the gas inside the cell.

The sealing section 110 has a reflection surface 112 (a first refection section) on which laser light oscillated by the laser diode 120 and having passed through the cavity 111 is incident at an incident angle of 45 degrees, and a reflection surface 113 (a second refection section) on which the laser light reflected by the reflection surface 112 is incident at an incident angle of 45 degrees. Metal films (114, 115) are formed on the reflection surfaces 112 and 113, thereby reflecting the laser light.

A heater 300 is disposed on an upper surface of the sealing section 110. The heater 300 is provided to maintain the temperature inside the cavity 111 at a constant level (80° C.-130° C.). The heater 300 heats the cell to thereby increase the cesium atom density, thereby increasing the atomicity to be excited by the laser light. As the atomicity to be excited increases, the sensitivity is improved, and therefore the accuracy of the atomic frequency acquisition apparatus 100 is improved.

Next, operations of the atomic frequency acquisition apparatus 100 are described. As shown in FIG. 2A, laser light (L) emitted from the laser diode 120 passes through the cavity 111, enters the sealing section 110, is reflected at the reflection surface 112 whereby its optical path is rotated through 90 degrees, is reflected at the reflection surface 113 whereby its optical path is again rotated through 90 degrees, passes again through the cavity 111, and is detected by the photodetector 130.

The laser light excites cesium atoms in the cavity 111 while passing through the cavity 111. A difference between the upper and lower sideband frequencies of the laser light when the intensity of the laser light passing through the excited cesium atom gas becomes the maximum concurs with the natural frequency of cesium atoms. Accordingly, by conducting feed-back control with an external circuit such that the intensity of the laser light detected by the photodetector 130 becomes the maximum, the modulation frequency of the laser diode 120 is adjusted.

The feed-back control system may be composed of a control circuit and a local oscillator connected to the atomic frequency acquisition apparatus 100, Outputs of the photodetector 130 are supplied through the control circuit to the local oscillator to perform feed-back control, whereby the oscillation frequency of the local oscillator is stabilized based on the natural frequency of cesium atoms.

The oscillation frequency adjusted in a manner described above is acquired from the local oscillator, and used as a standard signal of an atomic clock.

It is noted that the configuration of the sealing section 110 is not limited to the configuration shown in FIGS. 1, 2A and 2B, and may be in any configuration having a first reflection section on which laser light oscillated by the laser diode 120 and passed through the cavity 111 is incident at an incident angle of 45 degrees, and a second reflection section on which the laser light reflected by the first reflection section is incident at an incident angle of 45 degrees. It is noted that the reflection surface of each of the first reflection section and the second reflection section may be formed with a spherical surface. By using a spherical surface, broadened laser light can be focused, and the accuracy of the apparatus can be increased.

Figure 3:
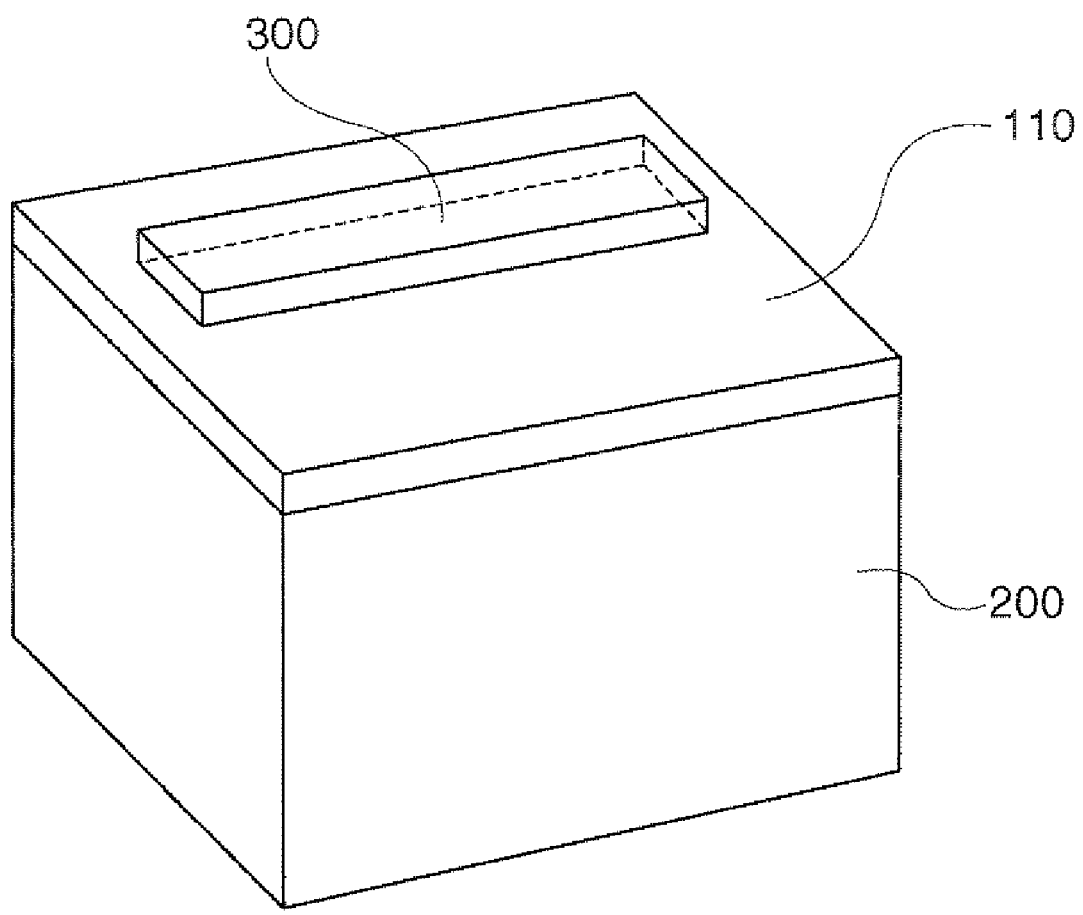
FIG. 3 is a perspective view of the structure of an atomic frequency acquisition apparatus in accordance with a modified example of the embodiment 1 of the invention.
Figure 4A:
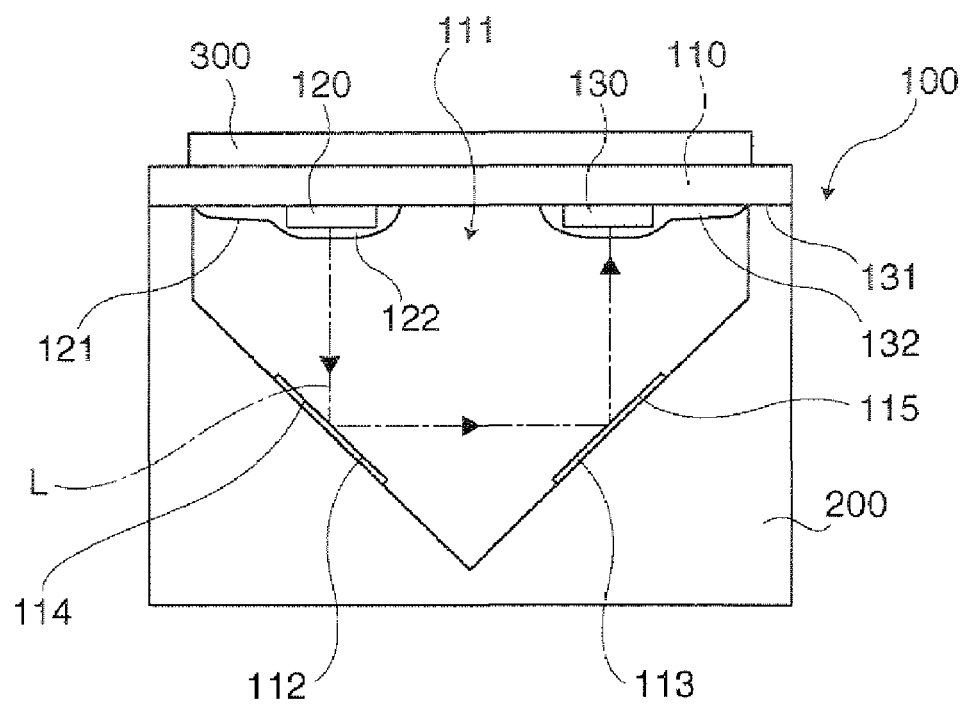
FIG. 4A is a cross-sectional view of the atomic frequency acquisition apparatus shown in FIG. 3.
Figure 4B:
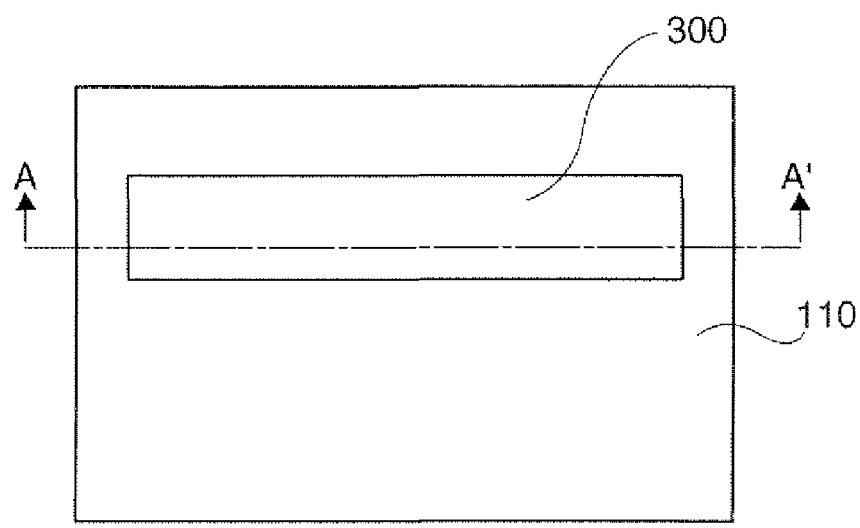
FIG. 4B is a plan view of the atomic frequency acquisition apparatus shown in FIG. 3.

FIG. 3 is a perspective view of the structure of an atomic frequency acquisition apparatus 100 in accordance with a modified example of the embodiment 1 of the invention. FIG. 4A is a cross-sectional view taken along a line A-A' in FIG. 4B, and FIG. 4B is a plan view of the atomic frequency acquisition apparatus 100. Reference numbers that are the same as those indicated in FIGS. 1, 2A and 2B denote corresponding components.

In the example shown in FIGS. 3, 4A and 4B, a laser diode 120 and a photodetector 130 are disposed on a common surface facing a cavity 111 of a sealing section 110.

Also, a ceramic package 200 has a reflection surface 112 on which laser light oscillated by the laser diode 120 is incident at an incident angle of 45 degrees, and a reflection surface 113 on which the laser light reflected by the reflection surface 112 is incident at an incident angle of 45 degrees.

Laser light (L) emitted from the laser diode 120 progresses straight through the cavity 111, reflected at the reflection surface 112 whereby its optical path is rotated through 90 degrees, is reflected at the reflection surface 113 whereby its optical path is again rotated through 90 degrees, advances straight again through the cavity 111, and is detected by the photodetector 130, as shown in FIG. 4A.

It is noted that the configuration of the ceramic package 200 is not limited to the configuration shown in FIG. 4A, and may be in any configuration having a first reflection section on which laser light oscillated by the laser diode 120 is incident at an incident angle of 45 degrees, and a second reflection section on which the laser light reflected by the first reflection section is incident at an incident angle of 45 degrees.

According to the embodiment 1 of the invention, the cell formed with the ceramic package 200 and the sealing section 110, the laser diode 120 and the photodetector 130 are integrated in one piece, such that the atomic frequency acquisition apparatus 100 can be made smaller in size, Also, installation of the atomic frequency acquisition apparatus 100 in an electronic apparatus or the like is simplified, which can improve the mass production efficiency.

Also, because the laser diode 120 is disposed inside the cell, a loss that may be caused by reflection of laser light at an incident surface of the cell can be prevented. Similarly, because the photodetector 130 is disposed inside the cell, a loss that may be caused by reflection of laser light at an emission surface of the cell can be prevented. As a result, the utilization efficiency of laser light can be improved.

It is noted that the cell is formed with the sealing section 110 and the ceramic package 200 in accordance with the embodiment 1. However, the cell may be formed only with glass material that forms the sealing section 110. Also, the cell may be formed such that laser light reflects a plurality of times at an upper surface or a lower surface of the cell.

Embodiment 2

Figure 5:
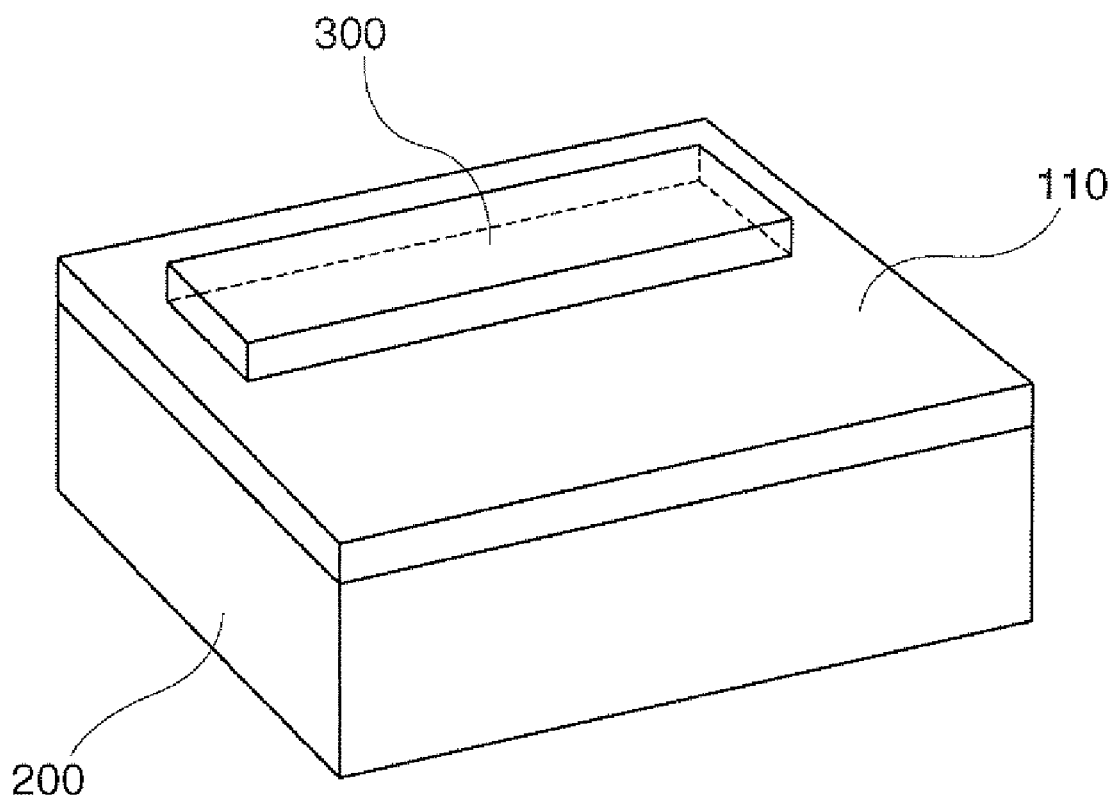
FIG. 5 is a perspective view of the structure of an atomic frequency acquisition apparatus in accordance with an embodiment 2 of the invention.
Figure 6A:
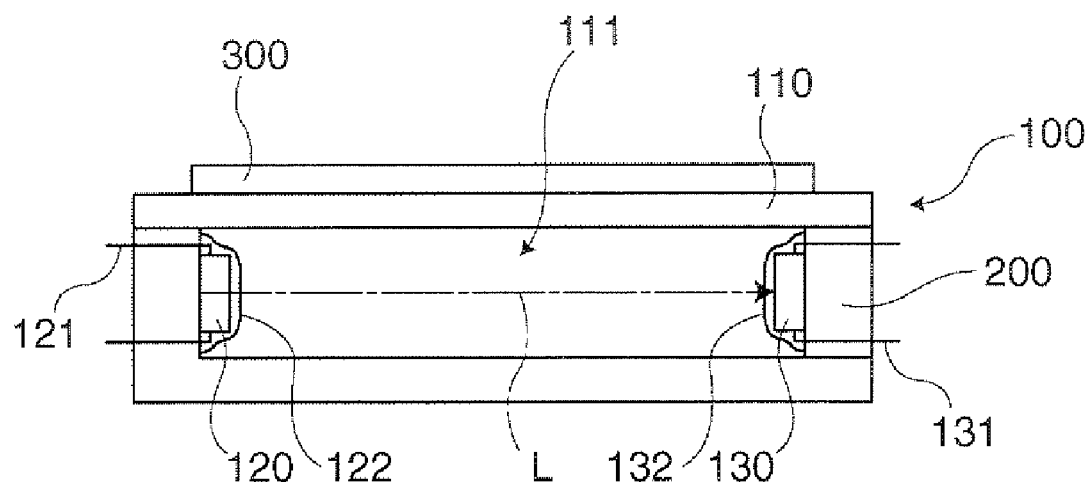
FIG. 6A is a cross-sectional view of the atomic frequency acquisition apparatus shown in FIG. 5.
Figure 6B:
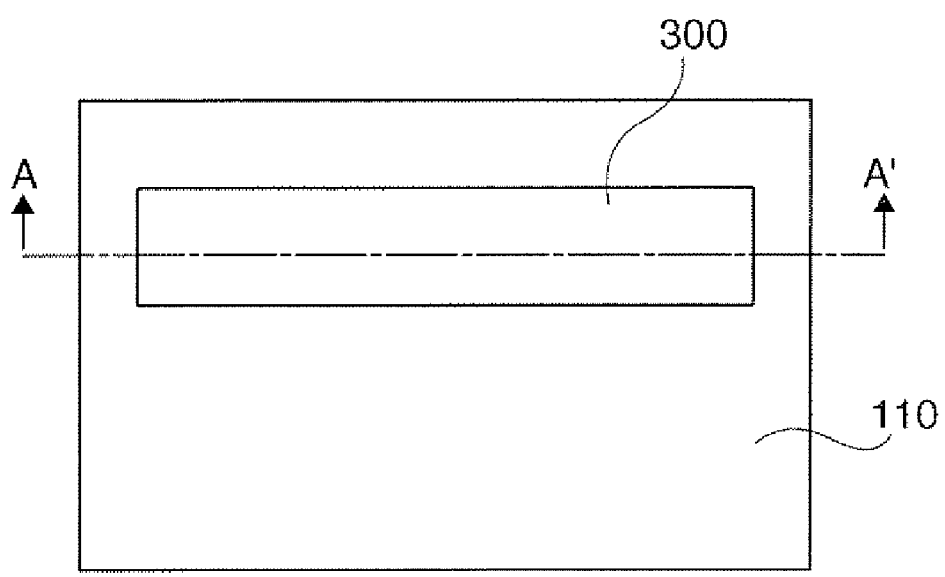
FIG. 6B is a plan view of the atomic frequency acquisition apparatus shown in FIG. 5.

FIG. 5 is a perspective view of the structure of an atomic frequency acquisition apparatus 100 in accordance with an embodiment 2 of the invention. FIG. 6A is a cross-sectional view taken along a line A-A' in FIG. 6B, and FIG. 6B is a plan view of the atomic frequency acquisition apparatus 100. Reference numbers that are the same as those indicated in FIGS. 1, 2A and 2B denote corresponding components. In accordance with the embodiment 2, a laser diode 120 and a photodetector 130 are disposed on opposing surfaces facing a cavity 111 of a ceramic package 200, respectively.

Laser light (L) emitted from the laser diode 120 advances straight within the cavity 111 and is detected by the photodetector 130, as shown in FIG. 6A.

According to the embodiment 2 of the invention, like the embodiment 1, the cell formed with the ceramic package 200 and the sealing section 110, the laser diode 120 and the photodetector 130 are integrated in one piece, such that the atomic frequency acquisition apparatus 100 can be made smaller in size. Also, installation of the atomic frequency acquisition apparatus 100 in an electronic apparatus or the like is simplified, which can improve the mass production efficiency.

Also, because the laser diode 120 is disposed inside the cell, a loss that may be caused by reflection of laser light at an incident surface of the cell can be prevented. Similarly, because the photodetector 130 is disposed inside the cell, a loss that may be caused by reflection of laser light at an emission surface of the cell can be prevented. As a result, the utilization efficiency of laser light can be improved.

It is noted that the laser diode 120 and the photodetector 130 only have to be mounted on mutually opposing surfaces, and therefore the mounting surfaces may be selected depending on the configuration of a cell in a manner that the longest optical path can be secured in the cavity 111.

It is noted that the cell is formed with the sealing section 110 and the ceramic package 200 in accordance with the embodiment 2. However, the cell may be formed only with glass material that forms the sealing section 110.

What is claimed is:

1. An atomic frequency acquisition apparatus comprising:
a cell enclosing atomic gas therein;
a laser light source that oscillates laser light that enters the cell and excites the atomic gas; and
a photodetecting section that detects the laser light that has passed the cell,
wherein the laser light source and the photodetecting section are attached to a common surface facing an interior of the cell, and
the cell includes a first reflection section on which the laser light oscillated from the laser light source is incident at an incident angle of 45 degrees, and a second reflection section on which the laser light reflected by the first reflection section is incident at an incident angle of 45 degrees.

2. An atomic frequency acquisition apparatus according to claim 1, wherein the first reflection section and the second reflection section are formed facing the interior of the cell.

3. An atomic frequency acquisition apparatus according to claim 1, wherein the cell has an opening section in a portion thereof, and further comprising a sealing section that is disposed to seal the opening section, wherein the first reflection section and the second reflection section are formed on a surface of the sealing section outside of the cell.

4. An atomic frequency acquisition apparatus according to claim 1, further comprising a protection film that covers the laser light source and the photodetection section.

5. An atomic frequency acquisition apparatus according to claim 1, wherein a part of the cell is formed with a ceramic package.

6. An atomic frequency acquisition apparatus according to claim 1, wherein the laser light source and the photodetection section are chips formed by an epitaxial lift-off method and mounted in the cell.

7. An atomic frequency acquisition apparatus according to claim 1, wherein the laser light source is a surface-emitting type laser light source.

8. An atomic clock comprising the atomic frequency acquisition apparatus recited in claim 1.

9. An atomic frequency acquisition apparatus comprising:
a cell enclosing atomic gas therein;
a laser light source that oscillates a laser light that enters the cell and excites the atomic gas; and
a photodetecting section that detects the laser light that has passed through the cell,
wherein the laser light source is attached to a first surface facing an interior of the cell, and the photodetection section is attached to a second surface opposing to the first surface.

* * * * *